United States Patent [19]

Gaymans et al.

[11]  4,408,036
[45]  Oct. 4, 1983

[54] PREPARATION OF POLYTETRAMETHYLENE ADIPAMIDE

[75] Inventors: Reinoud J. Gaymans, Enschede; Edmond H. J. P. Bour, Limbricht, both of Netherlands

[73] Assignee: Stamicarbon BV, Geleen, Netherlands

[21] Appl. No.: 247,548

[22] Filed: Mar. 25, 1981

[30] Foreign Application Priority Data

Mar. 26, 1980 [NL] Netherlands .................. 8001763

[51] Int. Cl.$^3$ ............................................. C08G 69/28
[52] U.S. Cl. .................................... 528/335; 528/336
[58] Field of Search .............................. 528/335, 336

[56] References Cited

U.S. PATENT DOCUMENTS 2,163,636  6/1939  Spanagel ........................... 528/335

FOREIGN PATENT DOCUMENTS 614625  12/1948  United Kingdom ............... 528/335

OTHER PUBLICATIONS

Journ. of Polymer Science, vol. 15, pp. 537–545 (1977).

Primary Examiner—Harold D. Anderson

[57]     ABSTRACT

A process for the preparation of white nylon 4,6 polyamide of high molecular weight from a tetramethylenediamine adipic acid prepolymer, formed under controlled conditions of temperature and water vapor pressure and wherein the plurality of cyclical end-groups in the prepolymer does not exceed 0.20 mg. equivalent per gram of prepolymer.

8 Claims, No Drawings

PREPARATION OF POLYTETRAMETHYLENE ADIPAMIDE

The invention relates to a method for the preparation of polytetramethylene adipamide, nylon 4,6, by heating the salt of 1.4 diaminobutane and adipic acid at an elevated pressure until a prepolymer is formed and by then further allowing this prepolymer to be condensed to the polytetramethylene adipamide product of a sufficiently high molecular weight.

The purpose of the invention is to devise a method in the practice of which a prepolymer is formed, in a short time, in a liquid phase, which prepolymer can then be converted, by after-condensation, into a white polyamide with a high molecular weight.

According to the invention, a polyamide substantially consisting of units of $-[NH-(CH_2)_4-NH-CO(CH_2)_4-CO]-$ is prepared by heating the salt of 1,4 diaminobutane and adipic acid and, if desired, other polyamide-forming compounds until a prepolymer is formed. In this process the prepolymerization is effected by heating the salt to a temperature of between 150° C. and 310° C. and, if desired, keeping the reaction mixture at a temperature of between 150° C. and 310° C. for a limited period, and in which process the water vapor partial pressure does not exceed 30 bar and the temperature, pressure and reaction time are so chosen that the plurality of cyclical end-groups in the prepolymer thus obtained does not exceed 0.20 mg equivalent per gram of prepolymer. Then, in a following step the said prepolymer is converted by after-condensation at an elevated temperature into a nylon 4,6 polytetramethylene adipamide having a high molecular weight.

By this method, white prepolymers can be prepared which can be converted, without problems, by further condensation into white high molecular weight polyamide.

It has now been found by the applicant that the prepolymerization or polycondensation of 1,4 diaminobutane with adipic acid is especially sensitive to side reactions. Apparently, in effecting the reaction under conditions which are not carefully controlled, cyclic derivatives of 1,4 diaminobutane, and cyclized oligomers, and prepolymers with cyclical end-groups are formed.

The reaction temperature is important for the proper progress of the reaction along with the temperature at which the reaction mass may be maintained for a limited amount of time, and the total reaction time and the water vapor partial pressure at which the reaction is effected. It is also desirable to avoid local overheating of the reaction mass, especially if the reaction mass should be in the solid state for some period. Thus, it may be advisable to limit the rate at which the temperature of the reaction mass is raised (to within the reaction range of between about 150° C. and about 310° C.) to at most 3.5° C./minute.

However, with proper precautions against local overheating and when the reaction mass is in the liquid state, a higher rate could be permitted. A heating rate of between 0.5° C./minute and 2° C./minute will be suitable in any case. However, the rate at which the reaction mass is initially heated up to 150° C. is less critical. That temperature increase can be effected in a very short time, e.g., up to 75° to 100° C. within only 10 to 20 minutes.

The salt of 1,4 diaminobutane and adipic acid can be supplied to the reaction in solid or dry form or as a moist mass or as a solution of slurry in water. Preferably, the quantity of water supplied is, at most, 50% by weight calculated with respect to the quantity of polyamide-forming compounds and water. When using substantial quantities of water, the water vapor partial pressure can, as the temperature increases, be kept below the 30-bar limit by blowing off steam. In connection with the after-condensation, an excess of 1,4 diaminobutane is preferably present, as further specified in the U.S. application Ser. No. 247,545, filed simultaneously herewith and claiming the priority of Netherlands patent application 8001764, the disclosure of which is incorporated herein by reference.

The reaction mixture is then heated to a temperature of between 150° C. and 310° C. At a reaction temperature below 150° C., the molecular weight of the prepolymer is too low. At a reaction temperature of more than 310° C., the process strongly tends to result in the formation of discolored prepolymers and prepolymers which are then more difficult to after-condense. A temperature of between about 175° C. and about 300° C. is the most suitable to prepare a white prepolymer with a sufficiently high molecular weight and which can be properly after-condensed. A temperature of between about 175° C. and about 220° C. is particularly preferred. The reaction mixture can be heated up to the desired reaction temperature in one single step; however, the reaction mixture can also be heated in two or more steps and, in between, be kept, for a longer or shorter time, at a temperature of between 175° C. and 300° C. The total duration of the prepolymerization reaction, including heating time, is generally between about 1.5 and 6 hours.

If the reaction is carried out at a temperature exceeding about 220° C., it has been found to be advantageous to keep the time of the reaction at the temperature range between 220° C. and 310° C. to the minimum necessary to heat the reaction mass to the required temperature.

Within the temperature range between about 150° C. and 210° C., and preferably about 175° C. to 210° C., the reaction mass may be kept at a constant temperature for longer periods of time, for example, for a period of between 15 and 120 minutes.

Whether or not the reaction mass is in the solid state or in the liquid state depends on the temperature, the degree of polymerization and the amount of water in the reaction mass, the last factor being related to the water vapor partial pressure in the reactor. At any stage during the prepolymerization, the reaction mass may be entirely in the solid state or in the form of a slurry containing solid particles. In order to remove the prepolymer from the reactor, it is preferred that the reaction mass be liquid at the end of the reaction, i.e., at least just prior to discharge from the reactor. However, it is further preferred to maintain the reaction mass in liquid form during the whole of the prepolymerization process in order to increase the rate of polymerization, to obtain a homogeneous product and to avoid discoloration by local overheating. This purpose is achieved by choosing the water vapor partial pressure ($P_{H_2O}$) sufficiently high so that sufficient water will remain in the reaction mass to keep the latter in the liquid phase at the temperature at which the condensation takes place. Water is generally formed in a sufficient quantity during the condensation reaction, but, if desired, additional water can, in addition to the salt, be fed to the reactor as well. A $P_{H_2O}$ of about 20 to 25 bar at temperatures of between 150° C. and 300° C. will, in general, and depending on the degree of polymerization, suffice for this purpose. At the prepolymerization reaction temperature, however, the $P_{H2O}$ must not be above 30 bar. At a $P_{H2O}$ of more than 30 bar a prepolymer is obtained which is difficult to convert into a high molecular polyamide by after-condensation.

Preferably, the $P_{H2O}$ will be not more than about 5 bar above the minimum partial pressure necessary to maintain the reaction mass in the liquid state.

Since the prepolymer has a melting point of between about 270° 1 C. and 290° C., it is possible to obtain the prepolymer in liquid form, virtually free of water, by heating the reaction mass to a temperature exceeding its melting point and releasing the pressure near or at the final temperature. The prepolymerization thus may be effected by heating the salt, with control of the $P_{H2O}$, with a continuous increase of the temperature to, e.g., 290° C. or 300° C. or by heating the salt to a temperature of preferably between 180° C. and 200° C., maintaining the temperature in said range for a limited period of time and then increasing the temperature to, e.g., 290° C. to 300° C. It is also possible to end the prepolymerization at a temperature below 270° C. by discharging the reaction mass in the liquid state from the reactor and releasing the pressure to atmospheric. The water will then escape from the reaction mass and the prepolymer will be obtained in solid form.

Applicant has found that it is very important to limit the number of cyclical end-groups in this nylon 4,6 prepolymer as much as possible. These cyclical end-groups are essentially pyrrolodinyl groups. It has been found that if there are more than 0.20 mg.eq./g. (milligram equivalent per gram) of cyclical end-groups, it becomes very difficult to convert the prepolymer within a reasonable time to a high molecular weight polyamide. Prepolymers having a cyclical end group content between about 0.10 and 0.20 mg.eq./g. and better yet between about 0.10 and 0.5 mg.eq./g. can, however, be favorably converted to high molecular weight nylon 4,6 polymers, provided that they also contain a rather large excess of 1,4 diaminobutane of, say, at least 3 moles % calculated on the stoichiometric amount of diaminobutane.

Preferably, the prepolymer forming reaction is carried out under such conditions that the content of cyclical end groups in the prepolymer is at the most about 0.10 mg.eq./g., because in that case the prepolymer can then most easily be converted to a high molecular weight polymer.

The starting salt can be prepared as already known in the art, for instance, by adding adipic acid to a solution of 1,4 diaminobutane until the equivalence point has been reached. If desired, extra diamine can be added to the salt. As specified in the said copending application Ser. No. 247,545, (see above) there are particular advantages in employing an excess of the diamine of between 0.5 and 15 moles %, more specifically between 1.5 and 5 moles %. Such an excess of diamine does not adversely affect the prepolymerization reaction.

The salt can then be fed to the prepolymerization reactor in dry form or as a moist mass or as a solution or slurry in water. An autoclave or pressure reactor, whether or not provided with a stirrer, can be used. The reaction can also be effected under atmospheric pressure continuously in a reactor suitable for this purpose. It is recommended, however, to effect the prepolymerization in the absence of oxygen in order to prevent discoloration, and to use a reactor material which is resistant to corrosion by the hot alkaline reaction mass, e.g., of titanium.

The reaction mixture, which is subjected to the prepolymerization, may also contain additives customary for polyamides, such as stabilizers, antioxidants, matting agents, etc.

The prepolymer is subsequently subjected to the after-condensation reaction. This after-condensation is preferably effected in the solid phase at a temperature of between 200° C. and 270° C., more specifically between 225° C. and 275° C., under an atmosphere containing water vapor, and for a period between 2 and 12 hours. The after-condensation procedure is described in more detail in the said above-referenced U.S. patent application Ser. No. 247,545.

In addition to diaminobutane and adipic acid, up to 20% by weight of other polyamide-forming compounds can be worked up in the prepolymer. In this connection, aliphatically-saturated lactams such as caprolactam, undecalactam, laurinolactam and other lactams, and amino carboxylic acids, such as 11-amino-undecanoic acid, and diamines such as hexamethylene diamine, and aliphatically-saturated or aromatic dicarboxylic acids such as succinic acid, sebacic acid, oxalic acid, isophthalic acid and terephthalic acid, may be used. Preference, however, is given to the preparation of the homopolyamide, which has itself very good physical properties.

The number-average molecular weight, $M_n$, of the prepolymer prepared by applying the method according to the invention should generally be between about 1000 and 15,000. Preferably, the reaction conditions, particularly the temperature, the water content and the duration of the reaction, are controlled so as to obtain a prepolymer with a molecular weight of between about 2000 and 10,000. By after-condensation, a polyamide can be obtained with a molecular weight of between 15,000 and 75,000. These polyamides are very suitable for making yarns and various objects. The invention will now be elucidated by means of the following Examples without being restricted to the embodiments described therein.

EXAMPLE I

A. The salt of 1,4 diaminobutane and adipic acid was prepared by dissolving 1 part by weight of the diamine in 8 parts by weight of methanol and placing this solution in a reactor provided with a stirrer and reflux cooler. Subsequently, while stirring, solid adipic acid was added slowly until the equivalence point was reached. After cooling, the precipitated salt was filtered off, washed with cold methanol and dried. Then 1,4 diaminoubutane was added in an excess amount of 2.1 moles-% with respect to the adipic acid. In the following Examples the salt was similarly prepared, except as specifically stated otherwise.

B. A 5-liter autoclave was filled with 1700 g of the salt obtained under A. and with 170 g of water. After flushing with nitrogen, the mass was heated to 180° C. in 80 minutes, and kept at that temperature for another 100 minutes. In this process, the pressure increased to, and was maintained at, 8 bar. Thereafter, the pressure was reduced to 1 bar, and the reaction mass was allowed to cool. The solid white prepolymer was removed from the reactor. It had a relative viscosity of 1.33 (at 1 g of polymer in 100 g 96% sulfuric acid at 20° C.) and a cyclical end group content [pyr] of 0.032 mg.eq./g. polymer.

In the Examples following hereafter, the same method was applied for the prepolymerization, albeit with different temperatures, times and pressures. If use was made of a salt which did not contain an excess of diaminobutane, the same result was achieved as far as the prepolymerisation is concerned.

C. The solid prepolymer was then ground to a particle size between about 0.1 and 0.2 mm and placed in a rotating reactor suitable for effecting reactions. After flushing with nitrogen, an oxygen-free mixture of 30% by volume of steam and 70% by volume of nitrogen, and heated to 260° C. was passed, at a pressure of 1 bar, through the rotating reactor. In this way, the prepolymer was subjected to after-condensation for 6 hours at a temperature of 260° C., the gas mixture specified above being continuously passed therethrough.

This method has been employed also in the following Examples for the after-condensation.

A white polytetramethylene adipamide nylon 4,6 product was thus obtained with an $\eta$rel. of 4.65 and [pyr] of 0.005 mg.eq./g.

EXAMPLE II

In the manner described in Example I, a prepolymer was prepared by heating the salt, which contained an excess of 8 moles % of diaminobutane, from 75° C. to 155° C. in 55 minutes and, then from 155° C. to 200° C. in 160 minutes. The pressure was, at most, 19 bar. The prepolymer thus obtained was white and had an $\eta$rel. of 1.23 ($M_n$ of 3500) and [pyr] of 0.028. By after-condensation (6 hours at 260° C.) a white high molecular weight nylon 4,6 polyamide could be obtained with a $\eta$rel. of 4.90 corresponding to an $M_n$ of 34,700.

EXAMPLE III

A mixture of 15 parts by weight of water and 100 parts by weight of 1,4 diaminobutane adipic acid salt, which contained an excess of 5.4 moles-% of diamine, was heated from 75° C. to 175° C. in 75 minutes and, then heated to 207° C. in 100 minutes. The pressure was limited, by blowing off steam, to 10 bar. The prepolymer had an $\eta$rel. of 1.20 ($M_n$ of 4,500) and [pyr] of 0.122. By after-condensation for 6 hours at 260° C., it was converted into a white nylon 4,6 polyamide with an $\eta$rel. of 3.37, corresponding to an $M_n$ of 27,400.

EXAMPLE IV

A mixture of 15 parts by weight of water and 100 parts by weight of 1.4 diaminobutane-adipic acid salt, which contained an excess of 8 moles-% of diamine, was heated from 20° C. to 210° C. in 240 minutes. The pressure increased to 19 bar. The prepolymer could then be converted by after-condensation (6 hours at 260° C.) into a white nylon 4,6 polyamide with an $M_n$ of 24,800.

EXAMPLE V

The salt of 1,4 diaminobutane and adipic acid was obtained by adding a solution of the dicarboxylic acid in methanol to a solution of the diamine in methanol until the equivalence point was reached. The reaction mixture was cooled and the salt was recovered by filtration, subsequently washed with methanol and dried. To the dry salt, 1.3% by weight of the diamine, calculated in respect of the salt, was added.

The salt was then placed in an autoclave. After flushing with nitrogen, the autoclave was heated. In 220 minutes, a temperature of 215° C. was reached, a heating rate 0.8° C./minute on the average, and varying during the experiment between 0.15° C./minute and 2.3° C./minute. In this process, the pressure increased from 1 bar to 14.6 bar. This was followed by blowing off steam to reduce the pressure to 1 bar. The reaction mass was then cooled. Thus, a solid white prepolymer for nylon 4,6 with an $M_n$ of 3500 was obtained.

EXAMPLE VI

In the way described in Example V, a salt was prepared with an excess of 1.3% by weight of 1,4 diaminobutane.

The prepolymerization was effected by heating the salt in an autoclave to 233° C. in 245 minutes at an average heating rate of 0.8° C./minute. In this process, the pressure increased to 18.7 bar. The prepolymerization was then discontinued by reducing the pressure to 1 bar and cooling the reaction mass. A white prepolymer for nylon 4,6 with an $M_n$ of 4100 was thereby obtained.

EXAMPLE VII

A mixture of 1700 g of the salt of adipic acid and 1,4 diaminobutane, containing 2.4 mol % excess diaminobutane, and 170 g water was heated in 60 minutes to 180° C. and then in 50 minutes from 180° C. to 295° C. In the temperature range of 200° C. to 260° C. the pressure was limited, by venting, to 13 bar and in the range from 260° C. to 295° C. the pressure was gradually released so as to reach 1 bar at 295° C. The molten prepolymer was discharged from the reactor, cooled and ground. The white prepolymer had an $\eta$rel. of 1.66 and [pyr] of 0.064 mg.eq./g. It was converted by solid phase after condensation (4 hours at 260° C.) to a nylon 4,6 polyamide of $\eta$rel. of 2.65.

EXAMPLE VIII

The procedure of Example VIII was repeated using the same starting composition, with the sole difference that the temperature was increased in 60 minutes to 180° C., and kept at this value for a further 60 minutes under a pressure of 8 bar, after which the reaction mass was heated to 295° C. in 40 minutes. The prepolymer had an $\eta$rel. of 1.66 and [pyr] of 0.053 mg.eq./g. and could then be similarly converted to a nylon 4,6 polyamide of $\eta$rel. 2.75.

EXAMPLE IX

The same starting mixture as in Example VII was heated to 220° C. in 75 minutes, and kept at 220° C. for 20 minutes with the pressure increasing to 18.5 bar. Then, the reaction mass was heated to 295° C. in 30 minutes with slow release of pressure starting at 260° C. The prepolymer had an $\eta$rel. of 1.63 and [pyr] of 0.078 mg.eq./g. After condensation (again 4 hours at 260° C.) yielded a nylon 4,6 polyamide of $\eta$rel. 2.65.

EXAMPLE X

The procedure of Example IX was followed with the sole difference that the reaction mass was kept at 220° C. for 120 minutes, with a pressure increasing to 22.5 bar. The prepolymer had an $\eta$rel. of 1.49 and [pyr] of 0.192 mg.eq./g. After-condensation then yielded a polyamide of $\eta$rel. 1.81. This shows that it is not advisable to maintain a temperature above 200° C. for too long a time as this leads to a rise of [pyr] and to a lower molecular weight of the end product.

EXAMPLE XI

The procedure of Example IX was followed, but now the temperature was increased to 250° C. in 80 minutes, kept at 250° C. for 20 minutes more with the pressure increasing to 27 bar, and then increased to 295° C. for 20 minutes. The prepolymer had an $\eta$rel. of 1.49 and [pyr] of 0.173 mg.eq./g. After-condensation yielded a polyamide of $\eta$rel. 1.90. This again illustrates the conclusions stated in Example X.

EXAMPLE XII

The procedure of Example VIII was repeated but now the molten prepolymer was kept at 295° C. and 1 bar (steam) for 60 minutes. The resulting prepolymer had an $\eta$rel. of 1.73 and [pyr] of 0.072 mg.eq./g. After-condensation yielded a discolored polyamide of $\eta$rel. 2.38. This shows the disadvantage of maintaining the high temperature too long.

EXAMPLE XIII

The procedure of Example VIII was repeated but using this time a mixture of 1000 g of the salt and 300 g of water. A prepolymer of $\eta$rel. 1.64 and [pyr] of 0.074 was obtained which could be converted (4 hours at 260° C.) to nylon 4,6 polyamide of $\eta$rel. 2.50.

EXAMPLE XIV

A mixture of 1000 g of butanediamine-adipic acid salt (diamine excess of 2.4 mole %) and 700 g of water was heated to 180° C. in 60 minutes, kept at 180° C. for a further 60 minutes with the pressure maintained at a maximum of 6 bar, and the reaction mass was then heated to 295° C. in 35 minutes with a maximum pressure of 13 bar, with slow pressure release starting at 260° C. The prepolymer had an $\eta$rel. of 1.65 and [pyr] of 0.068 mg.eq./g. After-condensation (4 hours at 260° C.) yielded a nylon 4,6 polyamide of $\eta$rel. 2.47.

EXAMPLE XV—COMPARATIVE EXAMPLE

A procedure which is suitable for the production of nylon 6,6 was followed, starting with a mixture of 1000 g of the diaminobutane-adipic acid salt (diamine excess 2.4 mole %) and 700 g of water. The mixture was heated to 215° C. in 60 minutes and then in 120 minutes from 215° C. to 275° C., the pressure being kept at a maximum of 18 bar. Then, the reaction mass was heated to 295° C. in 15 minutes with slow release of pressure. The white prepolymer had an $\eta$rel. of 1.36 and [pyr] of 0.263 mg.eq./g. After-condensation (4 hours at 260° C.) yielded a polyamide of $\eta$rel. 1.71. This procedure is clearly unsuitable for the production of useful nylon 4,6.

EXAMPLE XVI

The procesure of Example XV was repeated with the difference that the temperature was increased from 215° C. to 275° C. in 30 minutes. The prepolymer now had a $\eta$rel. of 1.50 and [pyr] of 0.143. By after-condensation, the $\eta$rel. was increased to 1.88.

EXAMPLE XVII

A mixture of 100 parts by weight of the diaminobutane-adipic acid salt (diamine excess 2.0 mole %), 10 parts by weight caprolactam and 10 parts by weight of water was heated to 180° C. in 60 minutes and kept at 180° C. for 180 minutes with the pressure being kept at a maximum of 8 bar. The prepolymer was then obtained as in Example I. It had an $\eta$rel. of 1.18 and [pyr] of 0.046 mg.eq./g. By after-condensation (4 hours at 260° C.) a nylon 6,4,6 copolymer was obtained of $\eta$rel. 3.25.

EXAMPLE XVIII

The procedure of Example XVII was repeated but now using 10 parts by weight of 11-amino undecanoic acid. The prepolymer had an $\eta$rel. of 1.20 and [pyr] of 0.030 mg.eq./g. After-condensation (4 hours at 260° C.) yielded a nylon 11,4,6 of $\eta$rel. 2.51.

When this Example was repeated using 20 parts by weight of 11-amino undecanoic acid, the resulting prepolymer had an $\eta$rel. of 1.18 and [pyr] of 0.035. After-condensation (6 hours at 250° C.) yielded a nylon 11,4,6 copolyamide of $\eta$rel. 2.42.

EXAMPLE XIX

A number of prepolymers were prepared, starting from a salt of 1,4 diaminobutane and adipic acid, containing 1.1 mole % excess diaminobutane, and varying amounts of water. The mixture in each case was heated in about two hours to a given temperature, kept at said temperature for 5 minutes, after which the reaction mass was discharged from the reactor and cooled with release of pressure. The relative viscosity and content of cyclical end-groups of each prepolymer were determined. The prepolymers were then subjected to after-condensation for 4 hours at 260° C. as in example I.

In Table 2 the water content of the starting mixture, the maximum temperature and maximum pressure and the physical data of the prepolymer and the final polyamide are given.

TABLE 1

| | prepolymerisation | | | | | after-condensation |
|---|---|---|---|---|---|---|
| exp't | water wt % | temperature °C. | $p_{H_2O}$ max bar | $\eta_{rel}$ | [pyr] meq/g | $\eta_{rel}$ |
| a | 33 | 180 | 5* | 1.25 | 0.024 | 3.45 |
| b | 33 | 210 | 15 | 1.09 | 0.113 | 2.20 |
| c | 33 | 210 | 5* | 1.92 | 0.021 | 5.71 |
| d | 33 | 250 | 5* | 2.03 | 0.040 | 2.75 |
| e | 13.5 | 202 | 7.7 | 1.08 | 0.024 | 3.75 |
| f | 8.8 | 300 | 15* | 1.62 | 0.132 | 2.29 |
| g | 8.8 | 210 | 14.4 | 1.22 | 0.051 | 3.14 |
| h | 4 | 224 | 16.7 | 1.28 | 0.099 | 3.33 |

*pressure kept to the given value by letting of water vapour.

Determination of the pyrrolidine endgroups in nylon 4.6

A glass tube containing 0.25 g of dry polyamide and 0.5 ml of 6 N hydrochloric acid is flushed with nitrogen, sealed and heated to 130° C. in an oil-bath. This temperature is maintained until the polyamide dissolves and for four hours afterwards. The tube is then cooled, with attendant formation of crystals of adipic acid, and opened. A sample for gas-chromatographic analysis is obtained by diluting 0.20 ml of the supernatant liquid with 0.70 ml of 2 N alcoholic sodium hydroxide. Analysis is carried out by bringing 1 $\mu$l of the sample on a preconditioned chromosorb (RTM) 130 column of 1.5 m × ¼″ which is heated for one minute at 150° C. and then heated to 220° C. with a heating rate of 13° C./minute.

Detection is carried out by catharometer method

The pyrrolidone peak is detected after 4.5 minutes and the 1,4 diaminobutane peak after 8 minutes. The diaminobutane content of nylon 4,6 is 0.005 mole/g.

The pyrrolidone content is calculated on the base of the ratio between the area of the diamino-butane peak and the area of the pyrrolidone peak with the formula [pyr]=5000/peak ratio, expressed in mmol pyrrolidine/g of polymer.

What is claimed is:

1. A process for the preparation of a white, high-molecular-weight nylon 4,6 polyamide, substantially consisting of repeating units of $$-NH-(CH_2)_4-NH-CO-(CH_2)_4-CO-,$$

which process consists essentially in
   (a) first forming in a separate first stage a polyamide prepolymer by heating a salt of 1,4-diaminobutane and adipic acid at a temperature between 150° C. and 310° C., wherein said heating within a temperature range of 150° C. to 210° C. is maintained for 15 to 120 minutes, and wherein said heating between 220° C. and 310° C. is minimized, while under a water-vapor-containing atmosphere, wherein the water-vapor partial pressure does not exceed 30 bar, discontinuing said first stage reaction when there has been obtained a polyamide prepolymer having
      (1) a content of cyclic end groups not exceeding 0.20 mg equivalent per g of prepolymer, and
      (2) having an $\eta_{rel}$ of between 1.08 and 2.03 at 1 g of polymer in 100 g of 96% sulfuric acid at 20° C. and thereafter
   (b) in a separate second stage, after-condensing said polyamide prepolymer, while
      (1) under a water-vapor-containing atmosphere,
      (2) and at a temperature of at least 200° C., to obtain a white, high-molecular-weight nylon 4,6 polymer having a $\eta_{rel}$ of at least 2.20 at 1 g of polymer in 100 g 96% sulfuric acid at 20° C.

2. The process of claim 1 wherein the second stage temperature is between 225° C. and 275° C., the polycondensation reaction being conducted in the solid phase.

3. Process according to claim 1, in which the content of cyclical end groups in the prepolymer does not exceed 0.1 mg.eq./g.

4. Process according to any one of claims 1 or 3, wherein the temperature and water vapor partial pressure in the final stage of the formation of the prepolymer are chosen so that the reaction mass can be discharged from the reactor in liquid form.

5. Process according to any one of claims 1 or 3, wherein the water vapor partial pressure is not more than about 5 bar higher than the minimum partial pressure necessary to keep the prepolymer reaction mass in liquid form at a given temperature and degree of polymerization.

6. Process according to any one of claims 1 or 3, wherein the first stage temperature is between about 175° C. and about 220° C.

7. Process according to any one of claims 1 or 3, wherein a mixture of the 1.4 diaminobutane-adipic acid salt with at most 50% by weight of water, calculated with respect to the quantity of salt and water, is employed to form said prepolymer.

8. The process of claim 1, wherein said after-condensation is carried out at a temperature between 225° C. and 275° C. for a period between 2 and 12 hours.

* * * * *